J. W. HUGHES.
TIME RECORDING APPARATUS.
APPLICATION FILED JUNE 28, 1917.
1,323,058.
Patented Nov. 25, 1919.
2 SHEETS—SHEET 1.
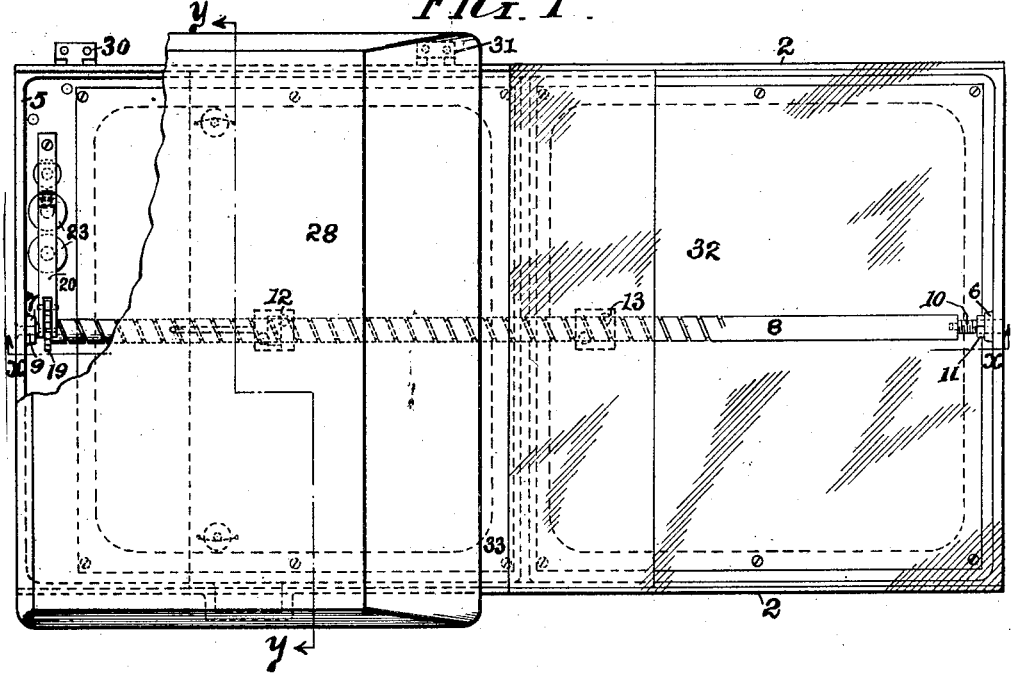
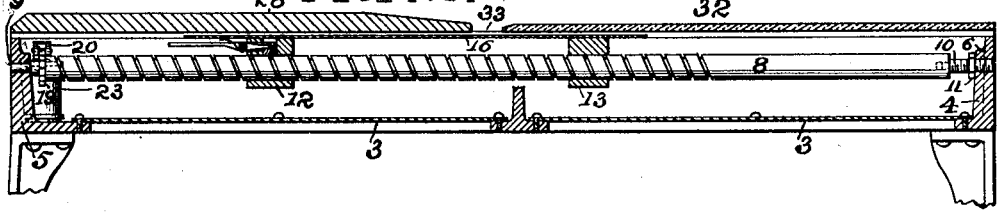
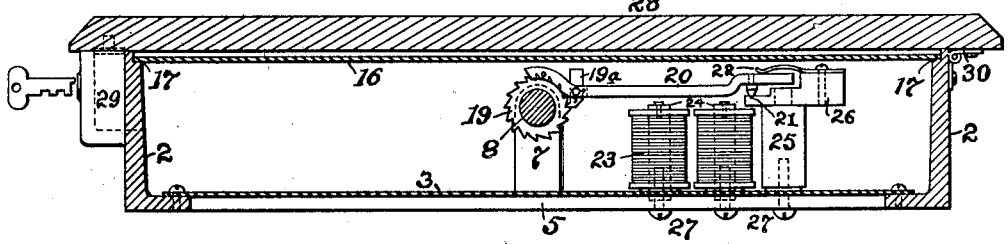
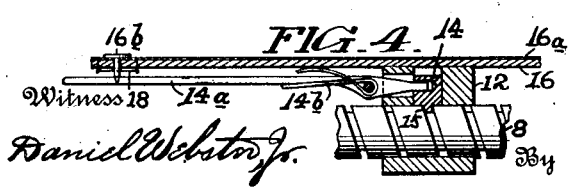
Inventor
James W. Hughes
Witness
Daniel Webster Jr.
By
Attorney J. W. HUGHES.
TIME RECORDING APPARATUS.
APPLICATION FILED JUNE 28, 1917.
1,323,058.
Patented Nov. 25, 1919.
2 SHEETS—SHEET 2.
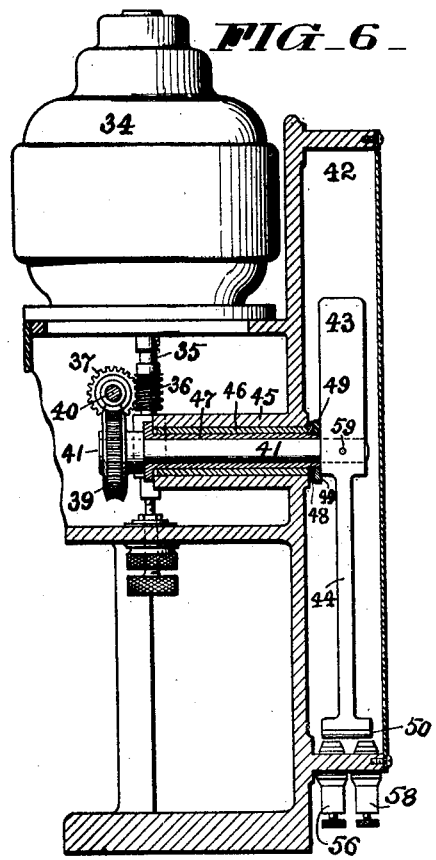
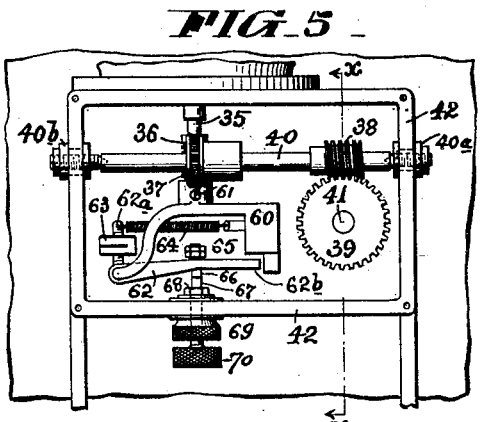
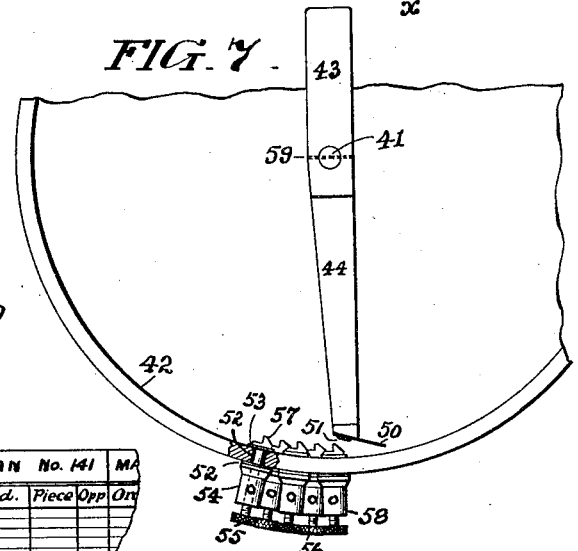
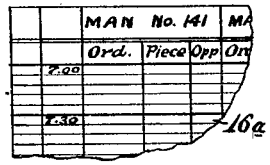
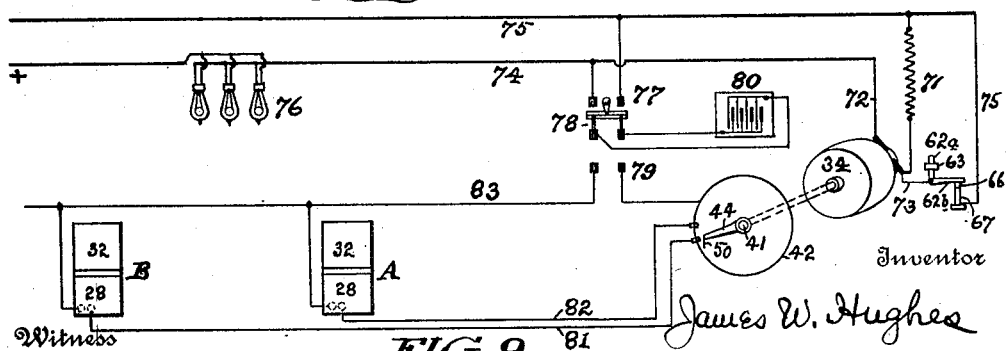

UNITED STATES PATENT OFFICE.

JAMES W. HUGHES, OF HADDON HEIGHTS, NEW JERSEY.

TIME-RECORDING APPARATUS.

1,323,058.  Specification of Letters Patent.  Patented Nov. 25, 1919.

Application filed June 28, 1917. Serial No. 177,483.

*To all whom it may concern:*

Be it known that I, JAMES W. HUGHES, a citizen of the United States, and resident of Haddon Heights, county of Camden, and State of New Jersey have invented an Improvement in Time-Recording Apparatus, of which the following is a specification.

The efficient management of a factory, a power plant or a railway system, largely depends on conclusions drawn from a continuous record of events occurring therein. My invention relates to that class of devices which enables such a continuous record to be kept.

The object of my invention is to provide an improved electric time chart mechanism in conjunction with which it is possible to manually record events at the time at which they occur; and such record when made, to be plainly visible, yet incapable of being altered except at the time of entry.

A further object of my invention is to provide an improved electric actuated time chart mechanism which shall be capable of securely holding a suitable chart or ruled sheet of paper and in a reliable manner moving the same at a uniform predetermined speed beneath a suitable table having an opening therein through which entry may be made on the chart beneath.

A further object of my invention is to provide an electric time chart mechanism through the use of which, in conjunction with suitably ruled paper, a record may be kept hourly, half hourly or by shorter intervals, of time put upon work done by men in a factory, of readings of electrical instruments in a power plant, of the arrival at and departure from a terminal of cars in a railway system, or any similar record wherein it is desired to make an "original" entry on a sheet at a position on the sheet corresponding to the time of day at which the entry is made.

My object is further to provide a time chart system in which a plurality of separate charts and their feeding mechanisms at different places may be operated from a master mechanism common to them all, whereby all of the charts will be simultaneously moved with speed, commensurate with the time records thereon, and so that time records of transactions or labor done may be made in various portions of a plant or works with accuracy as to the time of entries and time consumed between successive entries.

My invention consists in certain improvements in mechanisms for operating the time chart whereby the above objects are attained, said improvements comprising certain organization and combination of parts which are fully described hereinafter and more particularly defined in the claims.

More specifically referring to the preferred form of my invention, I provide a suitable motor device running at substantially constant speed, a chart carrier adapted to be moved at uniform speed beneath a suitable slotted table, an electrical means connecting said motor device with said chart carrier whereby said chart carrier is moved at uniform speed, and a suitable closure having a transparent table provided with an opening therein adapted to allow entries to be made on said chart beneath.

For the purpose of illustrating my invention, I have shown in the accompanying drawings the embodiment thereof which is at present preferred by me, since the same is in form to give satisfactory and reliable results, but it is to be understood that the several instrumentalities of which my invention consists, can be variously arranged and organized and that my invention is not limited to the precise arrangement and organization of these instrumentalities as herein shown and described.

Referring to the drawings: Figure 1 represents a plan view of the electric time chart mechanism proper embodying my invention; Fig. 2 represents a longitudinal section of the same taken on line $x$—$x$ of Fig. 1; Fig. 3 represents a cross section of the same taken on line $y$—$y$ of Fig. 1; Fig. 4 represents a sectional view of a detail of the driving means for the chart carrier; Fig. 5 represents an elevation of the constant speed contact making device used in conjunction with the electric time chart mechanism proper; Fig. 6 represents a section of the constant speed contact making device taken on line $x$—$x$ of Fig. 5; Fig. 7 represents a detail of the contact making arm shown in Fig. 6; Fig. 8 represents a portion of chart paper such as may be used; and Fig. 9 represents a diagrammatic layout of a system having a plurality of electric time chart mechanisms and one master constant speed contact making device.

2 designates a box frame of any convenient material such as wood or iron, closed at the back by the plates 3 and adapted to be supported in a horizontal position or with one end 5 somewhat higher than the other end 4. The ends 4 and 5 have formed thereon suitable bearing bosses 6 and 7 which carry between them the screw threaded rod 8. This rod at one end is journaled directly in a suitable hole 9 in the boss 7 and at the other end is pivoted axially by a spindle 10, threaded into boss 6 and provided with a lock nut 11. This construction permits of adjustment of the distance between the bearings on which the rod 8 is free to rotate. Slidingly mounted on the rod 8 are two chart carrier blocks 12 and 13, the former being formed with an adjustable central part 14 having a tongue 15 which fits into the groove of the thread on the rod 8. Secured to the carrier blocks is a chart carrier plate 16, which extends the entire width of the box frame and slidingly fits the guide recesses 17 formed in the sides of the said frame. It will be apparent that if the rod 8 be rotated, the block 12 will be moved along the rod and carry with it the chart carrier plate 16 and its guide block 13. The part 14 may be shifted by lever 14ª to release the chart carrier, and a spring 14ᵇ normally insures engagement with the screw rod. 16ª is the chart and may be secured to the carrier plate by thumb tacks 16ᵇ and to prevent the working loose of the same a friction device is provided, consisting of a stretched wire 18 against which the shank of the thumb tack bears. The friction between the wire and the thumb tack is sufficient to hold the latter securely in position.

Fixed to the rod 8, adjacent to the end thereof carried by bearing 7, is a ratchet wheel 19 which is adapted to be engaged by a spring mounted pawl 19ª carried by the ratchet lever 20. The latter is formed of magnetic material and is pivoted on a knife edge at 21 and subjected to the action of spring 22, which tends to keep it in fixed position away from the electromagnet 23. The lever 20 forms the armature for this magnet and when the latter is energized by suitable electric current, the lever is moved toward the magnetic cores 24 of the electromagnet 23 to actuate the pawl 19ª. The magnetic pull on the lever is resisted by the action of the spring 22, which bears on the lever 20 beyond the fulcrum point 21. This spring is secured to a suitable support 25 by means of a screw 26. The magnet coils 23 and the lever support 25 are fastened to the end piece 5 of the box frame 2 by means of suitable screws 27. The action of the lever and ratchet mechanism is as follows: When the electromagnetic coils 23 are energized by suitable electric current the lever 20 is attracted and moves toward them about the knife edge fulcrum or pivot 21. In so doing, the pawl 19ª rotates the ratchet wheel 19 through the distance of one tooth and consequently rotates the rod 8 by the same angular amount. The intermittent rotation of the rod 8 causes the carrier block 12 to be fed forward by the action of the tongue 15 in the groove of the screw thread cut on the rod. The movement of the carrier block 12 moves the chart carrier plate 16 which is affixed thereto, together with the guide carrier 13. When the current in coils 23 is cut off, the magnetic cores are de-magnetized and the lever 20 moves back to its outer limits under the action of the spring 22. In moving back, the spring actuated pawl 19ª slips over a tooth without turning the ratchet wheel and when the magnet is again energized, the ratchet wheel is again rotated in the same direction as before through the arc of one tooth. It will thus be apparent that a step by step movement has been derived whereby the chart carrier plate 16 may be moved along the frame or case under the control of the electromagnet when successively energized and deënergized.

Forming a cover for the mechanism above described is a lid 28 of wood or other suitable material preferably hinged at 30 and 31 and provided with a lock 29. This lid may project a short distance beyond each side of the box frame 2 and covers substantially one half of the box frame, namely the half extending from the end 5 thereof. From the other end 4 of the frame, a cover plate 32 of glass or other transparent material extends toward the lid 28 but terminates a short distance therefrom, so as to leave a space 33 through which entries on the chart 16ª may be made. When first, the mechanism is put into operation, the chart and chart holder are moved adjacent end 5 of the box frame and the main portion of the chart is completely hidden or shielded by the lid 28. When the ratchet device is operated, the chart is moved toward the end 4 and passes beneath the open space 33 through which the entries upon the chart are made. The portion of the chart having the entries thereon ultimately passes beneath the transparent window or cover plate 32 through which the entries may be read. It is apparent, however, that they are not accessible for erasure or alteration when once they have passed beneath the said transparent window 32 unless the lid 28 be unlocked and the chart removed.

To remove a chart after it has been filled with entries and has reached the limit of its travel, the lid 28 is unlocked and swung back, the part 14 having the tongue 15 is moved from engagement with the screw rod 8, and the chart carrier plate 16 is then moved back to its starting position beneath the lid 28. Here the old chart may be removed and a new chart placed in position upon the carrier plate. The lid may then be closed and locked and the mechanism is then ready to operate again.

The device thus far described is complete in itself, but in order to function, the magnet 23 must be excited at regular intervals so as to move the chart at a uniform speed. To accomplish this, I have provided a constant speed contact making and breaking device constructed as follows:

34 is any suitable motor device rotating at substantially constant speed, such as a shunt wound continuous current motor, an induction motor, or a clock mechanism, and having a shaft 35 projecting therefrom. On this shaft is formed a worm 36 which meshes with a worm-wheel 37 carried by the counter shaft 40. The latter is rotatably mounted on the bearings 40ª and 40ᵇ which are inserted in the sides of the box frame 42. The latter may form a supporting structure for the entire constant speed device. Mounted on the shaft 40 is a worm 38 meshing with and adapted to drive a worm-wheel gear 39. This worm-wheel is secured to a shaft 41. It will be seen that, by means of the worms and gears above described, there is a great reduction in speed from the shaft 35 to the shaft 41. In other words, the shaft 35 may be rotating at 800 revolutions per minute while the shaft 41 was making 1 revolution in a minute, or any other predetermined ratio.

The shaft 41 is mounted in a sleeve bearing 47, which is in turn within a sleeve 46 and the inwardly projecting boss 45. The sleeve 47 is secured by the nut 48 which acts on a threaded end of sleeve 47 to draw a shoulder formed on the inner end tight against the boss 45. The nut 48 is fixed in position by means of a lock-nut 49. The above comprises a device which will drive the shaft 41 at a substantially constant speed, but in order to secure a speed still more uniform, I have included an electric governing device which is adapted to be used with a continuous current motor. The principle of the operation of the governor is to cause to be inserted a suitable resistance in series with the motor when the speed becomes too great and to shunt the resistance by a path of lesser resistance when the speed has decreased beyond the desired revolutions. The motor shaft 35 has secured to its lower end a yoke piece 60, the same being secured by the set-screw 61. To this yoke piece is pivoted one end of a lever 62. The lever 62 is formed with a vertical arm 62ª and a horizontal arm 62ᵇ and its pivot is at the junction of the two arms. The vertical arm 62ª carries a weight 63 and also has a spring 64 attached to it, linking it to the yoke piece 60. The horizontal arm 62ᵇ carries a vertically arranged contact making piece 66, which is secured to the arm by the nuts 65. Beneath the contact making piece 66 is the fixed contact 67. The latter passes through the frame 42 in an insulated bushing and has a knurled head 70. The contact 67 is threaded and carries a hexagonal nut 68 and a thumb nut 69. By adjusting the nuts 68 and 69, the amount by which the piece 67 projects through the frame 42 may be varied so that the gap separating the contacts 66 and 67 may be made greater or less, as desired. The thumb nut 69 likewise provides a convenient means for making an electrical connection to the contact 67 by means of a wire. It will be noted that contact 66 is not insulated from its supporting lever 62 and hence is grounded to the frame 42. The electrical connections to the motor 34 comprise the line wires 74 and 75 having therein, if necessary, a bank of lamps 76 for voltage regulation. The wire 74 connects direct to the motor brush 72 and the wire 75 connects to the motor brush 73 through a resistance 71. This resistance is shunted by the contact making device above described, one end of the resistance being grounded to the frame 42 and hence in electrical connection with the upper contact piece 66, whereas the other end of the resistance is connected to the binding post 70 and hence to the lower contact 67. It is obvious that when there is a gap between the contacts 66 and 67 the resistance 71 will be in the motor circuit, but that when the contacts 66 and 67 are closed, the resistance will be shunted through a low resistance path.

The operation of the constant speed governor is as follows: It will be noted that the yoke piece 60 is carried by the motor shaft 35 and rotates as the shaft rotates. Consequently there is a centrifugal force acting on the weight 63, tending to make it fly out from the shaft 35 and this force is opposed by the tension in the spring 64. When the speed exceeds a certain amount, the centrifugal tendency of the weight overcomes the action of the spring and the arm 62ª moves outward, the lever 62 turns on its pivot and the horizontal lever arm 62ᵇ moves up. This action raises the contact 66 clear from the contact 67 and consequently inserts the resistance 71 in the motor circuit by breaking the shunt path around it. This lowers the motor speed and consequently lowers the speed of the governor yoke 60. As a result, the weight 63 has less centrifugal tendency and the spring 64 acts thereon to draw it toward the shaft. Hence lever arm 62ª moves in and lever arm 62ᵇ moves down, thereby causing the contacts 66 and 67 to become closed again. Thus it will be seen that there will be a constant slight hunting action above and below a certain average speed which will be practically maintained. This average speed may be increased by lowering the contact 67, or it may be decreased by raising it. The contacts, as will be seen, are easily renewable but renewal will seldom be required as they do not open a circuit but instead, merely shunt a resistance.

The contact making feature of the device consists of an arm 44 mounted on the shaft 41 and fixed thereto by a pin 59. This arm has affixed at one end a wiping contact piece 50 secured by a screw 51 and the other end formed as a balance portion 43. The wiping contact piece 50 is adapted to make contact with a number of fixed contact pieces 57 as the arm 44 is rotated by the shaft 41. The contact pieces 57 project through holes in the frame 42 and are insulated therefrom by the insulating bushings 52 and insulating washers 53. Their outer ends are screw threaded, and carry the threaded sleeves 54 and the thumb nuts 55 which, taken together, form suitable electrical binding posts. I have shown a number of such binding posts and fixed contacts, as 56 and 58 for example, and these are arranged in staggered relation on a rim of the frame 42. The object of staggering the posts is to enable more of them to be placed in a rim of given diameter where it is desired that the wiping contact piece 50 should make contact with only one fixed contact piece at a time.

It will now be seen that the constant speed contact making device above described will operate to rotate the arm 44 and consequently the wiping contact piece 50 at substantially constant speed. Thus, contact will be made between the arm 44 and contact portions of successive binding posts 54, 56, 58, etc., at regular intervals.

The electrical connections between the constant speed contact making and breaking device and the electric time chart mechanism are shown in Fig. 9 and consist of a storage battery 80 or other source of substantially constant voltage, a double pole double throw switch having its center points 78 connected to the battery, its upper contacts 77 to a source of electric potential suitable for charging purposes, one of its lower contacts 79 to the frame 42 of the constant speed contact maker and the other of its lower contacts to one terminal of the electric time chart mechanism. The other terminal of the electric time chart mechanism is connected to one of the contact maker binding posts, such as 55.

The operation of the entire system is as follows: The motor 34 is first put into operation by connecting it with a suitable source of electric potential and the governor mechanism above described operates to keep its speed substantially constant. Hence the contact maker 50 will rotate at uniform speed and make contact with the binding post contacts (such as 54) at regular intervals. Assuming the storage battery to be fully charged, the terminals 78 and 79 are connected by throwing the double pole double throw switch down, and thus placing the electric time chart mechanisms A and B in electrical communication with the constant speed contact making device. By these means, electric impulses will be transmitted at regular intervals to the magnet coils 23 of the chart operating mechanism. They will operate the lever 20 and pawl 19ª at regular intervals, once for each revolution of the wiping contact 50, and in consequence the chart carrier 16 will move along the rod 8 through the action of the mechanism before described. It will be apparent that the speed of the chart carrier will be determined by the speed of the motor device 34 and if the speed of the latter be constant, then the speed of the chart carrier will likewise be constant.

As the chart moves beneath the open window space 33, the desired entries may be made thereon. The speed of the chart is so low that this is easily possible. A chart speed of from ½ to ¾ of an inch per hour might be employed, for example, though I do not limit myself in this respect. The chart carrying the entries passes forward beneath the transparent window plate 32 where it is readily visible but not available for erasure or alteration. The foreman or superintendent may thus at all times readily ascertain the time being put upon the work being done by each workman.

Additional time chart mechanisms may be connected to each binding post of the constant speed contact maker through wires such as 81 and 82 and a common return to the double pole double throw switch made through the wire 83. In the diagrammatic view Fig. 9 is shown the circuits for operating a plurality of chart feeding mechanisms, two of which are shown at A and B by way of example, and there may be any number of these desired, located at the different departments of the factory and all operated by the same master controller, so that they all operate at exactly the same speeds and only one controller requires attention for the whole system.

A portion of a chart is shown in Fig. 8, suitably ruled for keeping a record of the work done by an operative in a factory. Each horizontal ruling corresponds to 6 minutes and 5 rulings (which make a large division) to 30 minutes or one half hour. The first vertical column is left blank for the purpose of binding, the next column is intended for recording the time of day and the following columns are divided into groups of threes, each group relating to the work of one man. The first man listed is #141 and in his first column is entered the order number or shop number of the job on which he is working. His second column is reserved for the entry of the piece number taken from a material list or blue print and his third column is to record the manufacturing operation or work being done on the piece.

The electric time chart mechanism and constant speed contact making devices, as above described, will enable an accurate reliable record of all facts entering into manufacturing or plant operation to be made. The record will be as accurate as possible within the personal errors of observation because it must be made at the time the events take place. It will be reliable, because it cannot be altered and is exposed for inspection in plain view and because the mechanism actuating the moving parts is simple and reliable. From the facts thus secured, conclusions may be drawn and action taken which results in more efficient management.

It will now be apparent that I have devised a novel and useful construction which embodies the features of advantage enumerated as desirable in the statement of the invention and the above description, and while I have in the present instance shown and described the preferred embodiment thereof which is best suited to give satisfactory and reliable results in practice, it is to be understood that the same is susceptible of modification in various particulars without departing from the spirit or scope of the invention or sacrificing any of its advantages.

What I claim as new and desire to protect by Letters Patent is:—

1. In apparatus of the character stated, the combination of a movable chart carrier and case therefor exposing only a small portion of the chart thereof at any time, with means to move the chart carrier in a rectilinear direction at uniform speeds in equal periods of time comprising a mechanical feed for the chart carrier, an electro-magnetic device for operating the mechanical feed, a source of electrical energy, circuits between the source of energy and the electromagnetic device, and a circuit interrupter for interrupting the circuit at uniform intervals of time consisting of a contact device for making and breaking the circuit, an electric motor for operating the contact device, and a governor means for insuring a constant speed for the electric motor.

2. In apparatus of the character stated, the combination of a chart carrier and case therefor exposing only a small portion of the chart thereof at any time, with means to move the chart carrier at uniform speeds in equal periods of time comprising a mechanical feed for the chart carrier, an electromagnetic device for operating the mechanical feed, a source of electrical energy, circuits between the source of energy and the electromagnetic device, and a circuit interrupter for interrupting the circuit at uniform intervals of time consisting of an electric motor electrically energized, means to intermittently shunt the energizing current away from the motor, and a centrifugal governor for controlling the shunting means.

3. In an apparatus of the character stated, a plurality of recording devices each having chart carriers, and a plurality of motor devices respectively for the chart carriers whereby they may each be intermittently propelled at uniform speeds in equal periods of time, combined with a source of energy, and means for controlling the energy and putting it successively in communication with the motor devices in succession at uniform and fixed intervals of time said means comprising a movable device for supplying the energy to each motor device in succession, a motor for operating the movable device, and a speed controlling governor for causing the motor to operate at a constant speed.

4. In an apparatus of the character stated, the combination of a plurality of chart carriers, electromagnetic devices for feeding the chart carriers in succession, and means for energizing the plurality of electromagnetic devices in succession each operating at a different period in the cycle of operations.

5. In an apparatus of the character stated, the combination of a plurality of chart carriers, a plurality of electromagnetic devices for feeding the respective chart carriers, a source of electric energy, electric circuits including the source of energy and the electromagnetic devices, a rotary circuit controlling arm for putting the source of energy into communication with the circuits of the plurality of electromagnetic devices in succession, a motor to rotate the rotary circuit controlling arm, and a speed controlling governor for causing the motor to rotate at a constant speed.

6. In an apparatus of the character stated, the combination of a plurality of chart carriers, a plurality of electromagnetically operated feeding devices for the respective chart carriers, circuits from near a source of electrical energy to the respective electromagnetically operated feeding devices said circuits terminating in contact terminals arranged in a circle, a rotatable contact arm pivoted concentrically to the circle of contacts and in communication with the source of energy, an electric motor to rotate the rotatable contact arm, and a governor for maintaining the speed of the rotatable contact arm constant.

7. In an apparatus of the character stated, a flat movable chart carrier, combined with a case inclosing and guiding the carrier and having a transverse opening above the carrier to permit writing on a limited portion of the chart at any period, a feeding device comprising a screw arranged longitudinally of the case for feeding the chart carrier and its chart bodily under the transverse opening, and a motor for operating the feeding screw intermittently to move the chart carrier equal extents for equal periods of time.

8. In an apparatus of the character stated, a flat movable chart carrier, combined with a case inclosing and guiding the carrier and provided with a hinged lid covering a part only of the case, the latter having a transverse opening entirely across and above the carrier and to one end of the lid to permit writing on a limited portion of the chart at any period and that portion of the case under which the chart carrier moves beyond the opening formed of glass to permit the writing on the chart to be read, immediately adjacent to the opening, a feeding device in the case for feeding the chart carrier, a motor for operating the feeding device intermittently to move the chart carrier equal extents for equal periods of time.

9. In an apparatus of the character stated, a chart carrier, and means movable with the carrier for detachably holding a chart sheet to the carrier, combined with a case inclosing the carrier and provided with a hinged lid covering a part only of the case, the latter having a transverse opening above the carrier and to one end of the lid to permit writing on a limited portion of the chart at any period and that portion of the case under which the chart carrier moves beyond the opening formed of glass to permit the writing on the chart to be read, a feeding device in the case for feeding the chart carrier, a motor for operating the feeding device intermittently to move the chart carrier equal extents for equal periods of time, and means within the case and inclosed by the lid for detaching the chart carrier from the feeding device for permitting it to be shifted relatively to the feeding devices and to its initial or starting position and recoupled with the feeding device.

10. In an apparatus of the character stated, the combination of a case, a covering top providing a transverse opening and a transparent window extending from one edge of the opening, so that the edge of the glass provides the side of the opening, a solid flat chart carrier movable within the case and across the transverse opening in the lid, and means within the case for feeding and permitting reciprocation of the chart carrier.

11. In an apparatus of the character stated, the combination of a case, a covering top providing a transverse opening and a transparent window extending from one edge of the opening, a solid flat chart carrier movable within the case and across the transverse opening in the lid, and means within the case for feeding the chart carrier said means comprising a feed screw, a motor for intermittently rotating the feed screw, and means on the chart carrier for engaging and disengaging the feed screw to enable the carrier to be reset to initial position without reversing the feed screw.

In testimony of which invention, I hereunto set my hand.

JAMES W. HUGHES.

Witnesses:
KATHRYN A. SUMMERS,
E. W. SMITH.